United States Patent
Matsumoto

(10) Patent No.: US 6,801,269 B2
(45) Date of Patent: Oct. 5, 2004

(54) METHOD AND DEVICE FOR CONNECTING DISPLAY PANEL SUBSTRATES

(75) Inventor: Yoshiie Matsumoto, Tokyo (JP)

(73) Assignee: Lan Technical Service Co., Ltd., Tokyo (JP)

( * ) Notice: Subject to any disclaimer, the term of this patent is extended or adjusted under 35 U.S.C. 154(b) by 59 days.

(21) Appl. No.: 10/052,773

(22) Filed: Jan. 23, 2002

(65) Prior Publication Data

US 2002/0105607 A1 Aug. 8, 2002

(30) Foreign Application Priority Data

Jan. 25, 2001 (JP) ........................................ 2001-016691
Jan. 10, 2002 (JP) ........................................ 2002-003066

(51) Int. Cl.[7] .............................................. G02F 1/1341
(52) U.S. Cl. ........................................ 349/58; 349/187
(58) Field of Search ........................ 349/58, 187, 189, 349/190, 93, 158, 155; 359/82; 445/25

(56) References Cited

U.S. PATENT DOCUMENTS 3,960,534 A * 6/1976 Oates ............................. 65/43
5,263,888 A * 11/1993 Ishihara et al. ................ 445/25
5,307,190 A * 4/1994 Wakita et al. ................. 359/82
6,036,568 A * 3/2000 Murouchi et al. ............. 445/25

* cited by examiner

Primary Examiner—Robert H. Kim
Assistant Examiner—Thoi V. Duong
(74) Attorney, Agent, or Firm—Wenderoth, Lind & Ponack, L.L.P.

(57) ABSTRACT

A method for connecting display panel substrates comprises the following steps. Firstly, a first substrate and a second substrate, whereon sealant material is disposed so as to form a waste region in the inner side region of the edges of the first and second substrates, are aligned in position and held. Thereupon, a spacer having a thickness substantially equal to a prescribed cell gap is inserted into the waste region between the first and second substrates. Next, the cell gap is determined by pressing the first and second substrates. The sealant material is hardened, whereupon the spacer is withdrawn. In this connecting process for fabricating a display panel, the cell gap can be set readily and precisely to a high degree of accuracy.

9 Claims, 11 Drawing Sheets

METHOD AND DEVICE FOR CONNECTING DISPLAY PANEL SUBSTRATES

BACKGROUND OF THE INVENTION

1. Field of the Invention

This invention relates to a method for connecting display panel substrates, and to a device for implementing same.

2. Description of Related Art

A display panel is fabricated by connecting together two substrates. A conventionally used substrate connecting process is now described with reference to FIG. 9. As illustrated in this diagram, a first substrate 110 is held on a first surface table (also known as "upper surface table") 142 provided with an X-axis driving mechanism 132. Similarly, a second substrate 112 provided with a sealant is held on a second surface table (also known as "lower surface table") 144 provided with a Y axis driving mechanism 134. Whilst observing alignment marks provided on the first substrate 110 and the second substrate 112, the X axis, Y axis are adjusted, along with a θ axis by means of a θ table 162 position beneath the second surface table 144. In other words, the second substrate 112 is aligned in position with the first substrate by rotating it in a horizontal plane by means of a rotating driving mechanism 136. Thereupon, the substrates are pressurized and connected by means of vertical raising and lowering means 138 and a pressure cylinder 160 capable of moving the first surface table 142 or second surface table 144 in the direction of arrow A. Since the gap between the two substrates (hereinafter, called "cell gap") is not uniform, display irregularities occur. Therefore, in order to maintain display quality, it is necessary to maintain an appropriate cell gap. This technology is called "Cell Gap Control". A substrate pressurizing mechanism comprising the aforementioned X axis driving mechanism 132, Y axis driving mechanism 134, rotation driving mechanism 136, vertical raising and lowering means 138, and pressure cylinder 160 is generally known in the prior art, comprising a variety of mechanisms. Therefore, since a mechanism of this kind can be constructed readily by a specialist in this field, detailed description thereof is omitted here.

For example, the connecting process in the fabrication of liquid crystal display elements using glass substrates, or the like, is performed by inserting a spacer made from glass fibre, or the like, together with the sealant, whilst simultaneously scattering a spacer made from resin, silica, or the like, over the entire interior surface of the cell between the substrates. However, this involves a detrimental effect in that the spacers reduce the contrast, and the like. In order to improve display quality, a so-called "spacerless" liquid crystal display is anticipated, wherein precise cell gap control can be achieved without placing spacers inside the cells.

Moreover, in organic EL panels, and the like, which have been the subject of increasing demand in recent years, it is not possible to place spacers on the entire interior surface of the cells, and hence precise cell gap control has not been achieved.

Furthermore, in the case of a liquid crystal display element using glass substrates, or the like, in order to sealing the interior of the cell completely, it is necessary to implement a process for initially placing the sealant, following by a process for sealing the opening section used to introduce the liquid crystal medium by providing sealant on that opening section, and therefore it has not been possible to provide sealant in such a manner that the interior of the cell is sealed completely in a single process. Consequently, the process for sealing the opening section is appended after the introduction of the liquid crystal medium, and therefore it is difficult to guarantee the adhesive strength of the sealed section, thereby giving rise to problems such as leaking of the liquid crystal medium after sealing, or the like.

Furthermore, in the case of an organic EL panel, since it is necessary to expel the air inside the cell when connecting the substrates, in many cases, rather than sealing the panel completely with the sealant, a process is adopted whereby a small gap is left in a portion of the panel and this gap is sealed at the same time that the substrates are pressurized and the cell gap is determined. However, problems frequently occur with respect to the adhesive strength of the sealing of this gap, and as a consequence, the display quality of the panel is degraded, and product lifespan is shortened.

SUMMARY OF THE INVENTION

The present invention was devised with the foregoing problems in view, an object thereof being to provide a method for connecting display panel substrates, and a device for implementing said method, whereby, in a substrate connecting process, it is possible to seal the entire circumference of the cell in a single sealing process using a sealant material, in other words, an individual sealing process, whilst simultaneously being able to set the cell gap readily and precisely, to a high degree of accuracy.

In order to achieve the aforementioned object, the method for connecting display panel substrates according to the present invention comprises the steps of:

(1) aligning the positions of and holding a first substrate and a second substrate whereon sealant material is disposed so as to form a waste region in the inner side region of the edges of the first and second substrates;

(2) inserting a spacer in the waste region between the first and second substrates;

(3) setting the cell gap by pressing the first and second substrates;

(4) hardening the sealant material; and (5) withdrawing the spacer.

In this way, according to the present invention, the sealant material is hardened after the cell gap between the two substrates has been adjusted and determined by the spacer. Therefore, it is possible to readily to set the cell gap correctly to a high degree of accuracy. Consequently, this invention is particularly suitable for use in fabricating organic EL panels, and the like, as well as fabricating liquid crystal panels which employ a so-called pre-connection injection process.

In implementing this invention, if the connection is performed inside an air-tight processing chamber, suitably, a further step of evacuating the processing chamber from normal pressure to vacuum (or vacuum pressure) is included between step (1) and step (2).

In this way, by adopting a composition for causing the substrates to adhere together inside a vacuum processing chamber, in particular, in the manufacturing process for an organic EL panel wherein the material used in manufacture are sensitive to moisture and oxygen, it is possible to eliminate factors which can significantly affect the quality of the panel, whilst being able to control the cell gap accurately by means of a simple process.

A preferred embodiment of the invention includes, between step (2) and step (3), a step of returning the processing chamber in a vacuum state to normal pressure whilst maintaining a pressure difference of substantially zero between the expected cell interior space of the processing chamber and the space outside the expected cell interior space.

By adopting this composition, occurrence of deformation in the substrates is suppressed, and hence the cell gap can be controlled accurately. Therefore, this method is particularly suitable for use in the manufacture process of a display panel using flexible substrates, for example.

Moreover, in a preferred embodiment of the invention, during step (1) to step (4), the first and second substrates are respectively fayed with and held on first and second surface tables, whilst drawing a vacuum between the outer faces of the first and second substrates on the other sides thereof to the mutually opposing inner faces of the substrates, and contact surfaces of the first and second surface tables which respectively confront these outer sides of the substrates.

In this case, in particular, if the connection is performed inside a processing chamber, the air suction power for evacuating the processing chamber as a whole should be less than the air suction power for hermetically sealing the first and second substrates.

By adopting this composition, it is possible to hold the substrates stably without the first or second substrate falling off, and without any divergence in the positions of the substrates with respect to the surface tables, and hence the cell gap can be controlled correctly to a high degree of accuracy.

Moreover, in a preferred embodiment of the invention, if the spacer is constituted by a plurality of three or more spacer elements layered together in a mutually separable fashion, then the cell gap set in step (3) is adjusted by the total thickness of this plurality of spacer elements. Thereupon, after hardening of the sealant material, in step (5), the spacer is removed by, first removing a spacer element located in substantially the middle region whilst leaving the spacer elements contacting and holding the first and second substrates, and then subsequently withdrawing the remaining spacer elements.

By this means, the thickness of a spacer having a connected structure can be adjusted more accurately to match the designed cell gap value. Moreover, if a spacer of this kind is used, then the spacer can be controlled without damaging the surfaces of the substrates, and hence a panel of excellent quality can be achieved.

In a preferred embodiment of the invention, the spacer is constituted by a tapered block-shaped spacer element whose thickness varies at a constant rate, the cell gap set in step (3) being adjusted by withdrawing the spacer from an inserted state.

Moreover, in cases where an additional auxiliary spacer element is appended to the spacer and the total thickness of the spacer and the auxiliary spacer element is set to a greater value than the prescribed cell gap; then in step (2), the spacer with the auxiliary spacer element is inserted in between the first and second substrates; and after step (2) and before step (3), fine adjustment is performed to achieve the prescribed cell gap by withdrawing the auxiliary spacer element.

In this way, fine adjustment of the cell gap can be made by withdrawing the tapered spacer or auxiliary spacer element, and hence more accurate adjustment can be achieved.

In a preferred embodiment of the invention, firstly, an additional auxiliary spacer element is appended to the spacer and the total thickness of the spacer and the auxiliary spacer element is set to a greater value than the prescribed cell gap. Thereupon, the first and second substrates are respectively fayed with and held on first and second surface tables, whilst drawing a vacuum between the outer faces of the first and second substrate on the other sides thereof to the mutually opposing inner faces of the substrates, and contact surfaces of the first and second surface tables which respectively confront these outer sides of the substrates. Next, the processing chamber is evacuated from normal pressure to a vacuum. In this vacuum pressure state, in place of the spacer in step (2), the spacer with the auxiliary spacer element is inserted between the first and second substrates, and the auxiliary spacer element is caused to contact the first substrate.

By this means, since the auxiliary spacer element holds the uppermost positioned substrate in the gravity direction, it aids the holding of the substrate by the surface table, and hence helps to prevent falling of the substrate. In conjunction with this, by creating a vacuum between the substrates and the surface tables, it is possible not only to hold the substrates, but also to suppress deformation of the substrates themselves, and hence more stable cell gap control can be achieved.

Moreover, desirably, in the method for connecting display panel substrates, the hardening of the sealant material is performed by irradiation of ultraviolet light.

Alternatively, the hardening of the sealant material is performed by heating.

Furthermore, in a preferred embodiment, a connecting device for display panel substrates according to the present invention is provided with the following principal components. Namely, this device comprises a first surface table and second surface table for respectively holding a first and second substrate, a spacer, spacer operating means, and sealant hardening means. The spacer has a thickness substantially equal to a prescribed cell gap. The spacer operating means serves to operate the spacer so as to insert the spacer in between the substrates, or withdraw the spacer from same. The sealant hardening means serves to harden the sealant material.

According to this device composition, it is possible to set the cell gap value according to the thickness of the spacer inserted in between the substrates, the set cell gap value being maintained whilst the sealant is hardened, whereupon the spacer can be removed. Therefore, the cell gap can be controlled precisely to a high degree of accuracy, and consequently, a display of high quality can be provided.

A further preferred embodiment of a connecting device according to the present invention further comprises substrate holding means for holding the first and second substrates by respectively sealing them hermetically to the first and second surface tables. This substrate holding means is able to cause the first and second substrates to be respectively fayed with and held on the first and second surface tables, whilst drawing a vacuum between the outer faces of the first and second substrate on the other sides thereof to the mutually opposing inner faces of the substrates, and contact surfaces of the first and second surface tables which respectively confront these outer sides of the substrates.

Moreover, desirably, when implemented, the connecting device according to the present invention comprises: processing chamber defining means for defining a processing chamber for connecting; and pressure adjusting means for changing the pressure of the processing chamber freely from normal pressure to vacuum pressure or from vacuum pressure to normal pressure; the processing chamber defining means being constituted principally by the first and second surface tables.

By adopting this composition, the cell gap can be controlled to a high degree of accuracy, whilst also achieving a compact composition of the device itself.

Moreover, desirably, in the connecting device according to the present invention, the spacer is constituted by a plurality of spacer elements numbering three or more, the respective spacer elements of the spacer being operated and layered in mutually independent fashion, whereby the total thickness of the spacer can be adjusted.

By adopting a spacer having a laminated structure, it is possible readily to make fine adjustment of the cell gap by withdrawing spacer elements, and hence the cell gap can be controlled to an even higher degree of accuracy.

Moreover, in a preferred embodiment of a connecting device according to the present invention, if the spacer is constituted by a single spacer element, then the spacer element should have a shape whereby the cell gap can be altered.

By adopting a spacer composition of this kind, if, for example, the spacer is a wedge-shaped block, in other words, a tapered block, having a thickness which decreases towards the tip thereof at the end which is inserted in between the substrates, then the cell gap can be set according to the thickness of the spacer as determined by the amount (distance or length) by which the spacer element is withdrawn from an initial state of insertion where it has maximum thickness at the outer sides thereof, and hence the cell gap can be finely adjusted to an even higher degree of accuracy.

Alternatively, in the connecting device according to the present invention, desirably, the spacer element comprises a rotating head section composed so as to have a smooth elliptical vertical section; the rotating head section having a shape whereby the cell gap can be controlled by means of the rotating head section contacting the first and second substrates by being rotating within the interval of the waste region.

Moreover, if either one or both of the first surface table and second surface table is a quartz table, then desirably, the hardening means is an ultraviolet light irradiating apparatus. In this case, ultraviolet light can be irradiated directly onto the sealant material from outside the surface table, thereby causing the sealant to harden.

Moreover, desirably, the first surface table and second surface table are heating tables made from metal. In this case, the sealant material can be hardened by heating through heating of the surface tables.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1A:
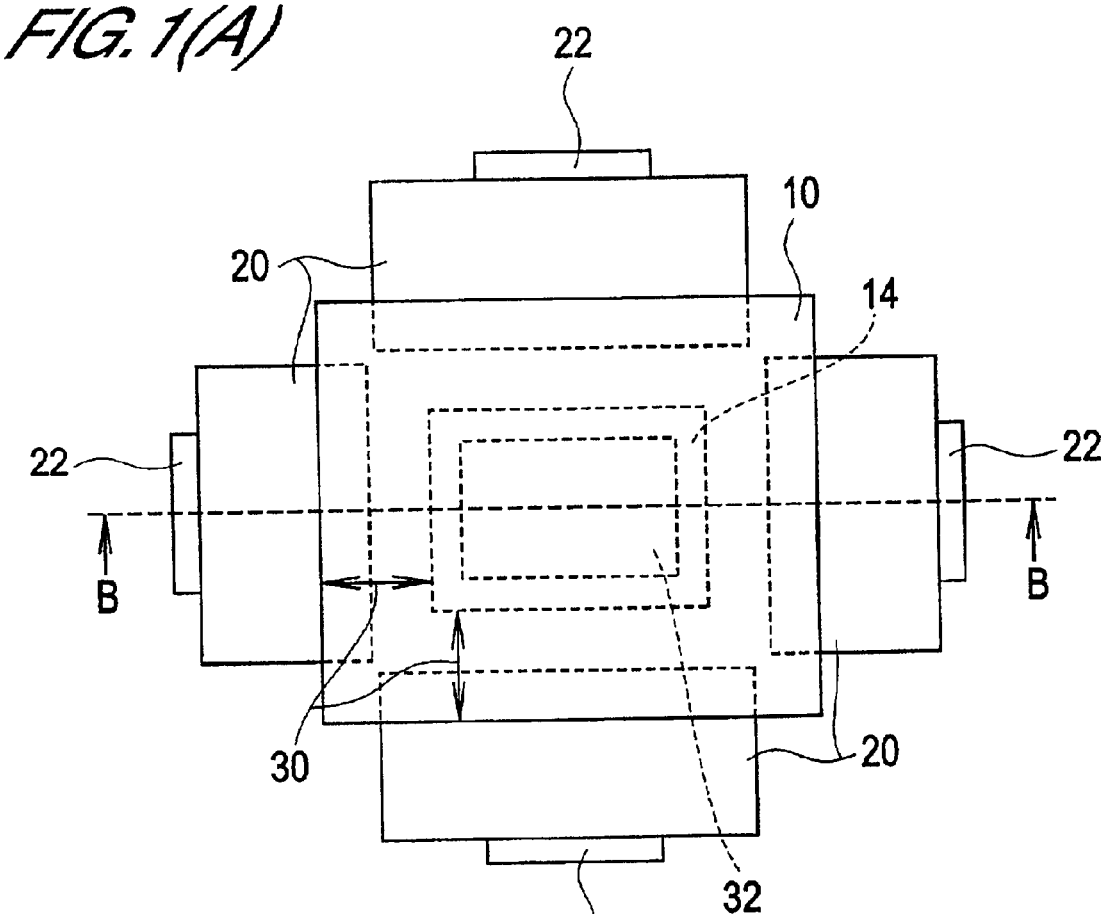
FIGS. 1(A) and 1(B) are illustrative diagrams of a first embodiment of the present invention, where, 1(A) is an approximate plan view of the principal parts of a connecting device for display substrates according to the present invention; and 1(B) is a sectional view taken along line B—B in 1(A)

Below, an embodiment of the present invention is described with reference to the drawings. The drawings simply provide approximate illustrations for the purpose of understanding the invention, but the present invention is not limited in particular by the drawings. Moreover, it should be noted that similar constituent elements in the respective drawings referred to in the following description are similarly labelled and repeated description thereof is omitted.

Furthermore, in implementing this invention, a substrate pressurising mechanism comprising surface tables, an X axis driving mechanism, an Y axis driving mechanism, a rotation driving mechanism, vertical raising and lowering means, and a pressure cylinder, as described previously with reference to FIG. 11 is used appropriately, but the compositions and mechanisms of these elements are known in the prior art and they do not form elements of the present invention, and detailed description thereof is omitted.

Moreover, in the following description of the embodiments, the present invention is described with reference to an example where it is applied to both a liquid crystal display device and an organic EL display device. In the case of an organic EL display device, an organic EL layer is formed previously onto one of the substrates to be connected or laminated. However, in the case of a liquid crystal display device, the liquid crystal is introduced into the cell space either before sealing or after sealing. This introduction of liquid crystal is common to the various compositional examples and hence is described here.

Similarly to the prior art, the method for introducing liquid crystal after sealing involves coating sealant onto one of the two substrates that are to be connected, then aligning the two substrates in position, setting the cell gap of the cell space, and hardening the sealant. Once the sealant has hardened, it is cut, and liquid crystal is introduced via the cut opening (liquid crystal introduction opening), whereupon the cut opening is sealed. The liquid crystal introduction opening may also be formed previously, when the sealant is coated.

On the other hand, a method for introducing the liquid crystal before sealing has become possible due to the discovery of a sealant material which does not degrade the liquid crystal when it comes into contact with the liquid crystal. One example such a sealant material is the product name "World Lock No.717" marketed by Kyoritsu Kagaku Sangyo. This sealant material uses a specially denatured acrylate as a main ingredient, and it has high viscosity. This sealant is coated onto one substrate to form a wall in the shape of a closed loop for the purpose of the cell gap, whereupon liquid crystal is dripped into the region inside this wall. Once the cell gap region surrounded by the sealant wall has been filled with liquid crystal, the cell gap is set and the two substrates are connected or combined or laminated together. Thereupon, the sealant is hardened. If this pre-sealing introduction method is used, merits are obtained in that the processes for forming a liquid crystal introduction opening in the sealant and closing that introduction hole become unnecessary.

Diagrams of the liquid crystal introduction equipment required for the liquid crystal introduction step, and diagrams illustrating the procedures for forming and sealing introduction holes, and the like, have been omitted.

(1) Description of Connection Method (First Embodiment)

Figure 1B:
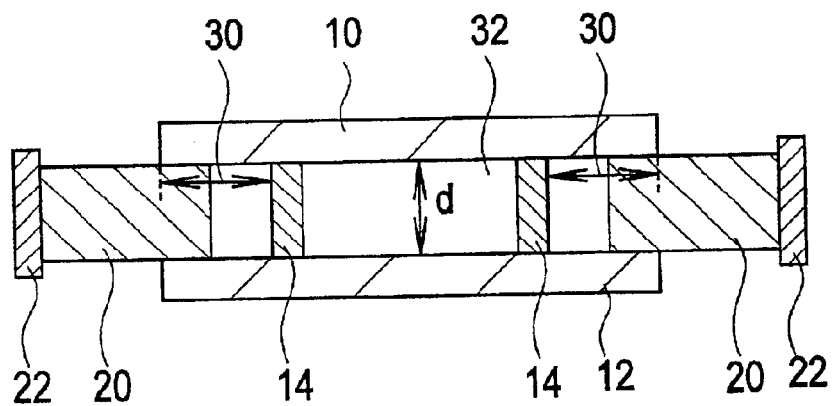

FIG. 1 is a diagram showing a first embodiment of the present invention. FIG. 1(A) is an approximate plan view showing the substrates when pressed from above in a display panel substrate connecting device (hereinafter, called "connecting device"). FIG. 1(B) is a diagram showing a sectional view along the broken line B—B. In order to explain the positional relationship between the substrates and the spacers, the first (upper) surface table and the second (lower) surface table which are actually present and are used in the connecting process, as well as the operating mechanisms for same, are omitted from the drawings unless their depiction is necessary (the same applies to the drawings described below).

FIGS. 1(A) and 1(B) illustrate a first embodiment of the present invention. Similarly to the prior art, a first substrate 10 and a second substrate 12 are aligned in position opposing each other. Whilst maintaining this mutually aligned state, the substrates are held in opposing fashion in a separated state. As in the prior art, a non-hardened pliant sealant material 14 is provided previously on the second substrate, so as to form a waste region 30 at the inner edge regions between the first substrate 10 and the second substrate 12. The waste region 30 is an empty space that is not used for display. In this case, as commonly known, the opposing faces of the respective substrates 10 and 12 are substantially parallel with respect to each other.

On the other hand, a spacer 20 is provided previously on the spacer operating mechanism 22. A spacer 20 having a thickness, preferably, substantially equal to the prescribed cell gap d is inserted into the waste region 30 between the first substrate 10 and the second substrate 12, by the spacer operating mechanism 22. Thereupon, the first substrate 10 and the second substrate 12 are pressed in such a manner that the mutually parallel opposing faces thereof approach each other, similarly to the prior art, by means of commonly known pressing means, for example, a servo motor or pressurizing cylinder. By this pressing action, the two substrates 10 and 12 are aligned in parallel on either side of the spacer 20, and the cell gap d is determined by means of the height of the sealant being set to equal a prescribed cell gap d. Thereupon, similarly to the prior art, after the sealing member has hardened, the spacer operating mechanism 22 is operated and the spacer 20 is withdrawn.

In the compositional example shown in FIG. 1, the cell interior 32 is a rectangular spatial region, and the sealant 14 is formed as a rectangular ridge or wall surrounding the cell interior 32. Furthermore, the waste region 30 is a spatial region on the outer periphery of the sealant 14.

Moreover, in this compositional example, the spacer 20 is a bulk-shaped square block, which has a uniform thickness that determines the interval between the substrates. In this compositional example, since a rectangular substrate is used, spacers of similar size are inserted simultaneously from the four corners of the substrates, between the substrates whilst these are separated by an interval greater than the thickness of the spacers.

In this embodiment, a glass substrate, plastic substrate, epoxy resin substrate, or the like, can be used for the first substrate 10 and the second substrate 12, but the present invention is not limited to this.

In particular, if the first substrate 10 and the second substrate 12 are commonly used glass substrates, then conventionally, a processing step for distributing a granular spacer made of resin, silica, or the like, over the entire surface of the cell interior 32 region is essential. However, due to demands for increased quality in liquid crystal display, and the like, if the properties of glass substrates and liquid crystal media, and the like, are improved in the future and the distributed placement of spacer into the cell interior can be obviated, then this processing step becomes obsolete.

Therefore, in addition to being applicable to a connecting process for organic EL panel substrates, this embodiment can also be applied suitably to a connecting process for liquid crystal panel substrates having a 'spacer-less' cell interior region. Moreover, although the drawings depict an example where a single display panel is obtained from a set of substrates, the invention is not limited to this, and may also be applied to a plural yield process for manufacturing 4 panels, . . . , 8 panels, or 80 panels, for example (this also applies to the following drawings).

In this example, an example where a sealant 14 is applied to the second substrate 12 is described, but the invention is not limited to this, and the sealant 14 may also be applied to the first substrate 10.

The sealant 14 employs an ultraviolet-setting and/or thermosetting sealant material which contains glass fibres as a spacer material, for example, as used in the prior art, but the sealant is not limited to this provided that it does not impede the objects of the invention.

Moreover, as described previously, the sealant 14 is placed in such a fashion that it forms a continuous wall which does not bisect the cell interior 32 (see FIGS. 1(A) and (B)). Moreover, with a view to determining the cell gap when pressurized, desirably, the sealant material should be formed to a somewhat greater thickness than the prescribed cell gap d. However, this does not necessarily apply in cases where the sealant material is previously known to have characteristics whereby it expands during the setting stage, for example.

The hardening of the sealant 14 is performed by a standard method, by irradiation of ultraviolet light in the case of an ultraviolet setting sealant material, or by application of heat in the case of a thermosetting sealant material, and if it is necessary to combine or mix or laminate two, three or more types of sealant material, then respective means and processes required for same should be combined appropriately.

If fabricating a liquid crystal display element using glass substrates, or the like, firstly, spacer granules are scattered over the inner surface of the substrates forming the cell interior 32. Thereupon, the first and second substrates are registered in mutually opposing positions. Next, prior to combining or connecting or laminating the first and second substrates 10 and 12, a liquid crystal medium is introduced to the inner surface of the substrate forming the cell interior 32 of the second substrate 12, by means of a liquid crystal introducing device (not illustrated). Thereupon, the respective processes employed in the present invention for introducing spacers between the substrates, determining the cell gap, hardening the sealant material, and withdrawing the spacers, are carried out. The present embodiment is particularly suitable for application to a liquid crystal manufacture process including a so-called "pre-connection injection" step, which is predicted to become the most common process for liquid crystal manufacture in the future. However, needless to say, it may also be applied suitably to conventional substrate connecting process wherein the liquid crystal medium is injected after connecting the first and second substrates.

The spacers 20 have a thickness that is substantially equal to the prescribed cell gap d. Here, "substantially equal to the prescribed cell gap", means that the thickness is equal to the cell gap under the conditions at which the spacer is used, for example, the atmospheric pressure, humidity, temperature and ultraviolet irradiation conditions, and the like.

In other words, it does not mean that the spacer thickness cannot be completely unequal to the cell gap d under the conditions of the fabrication stages of the spacer 20 itself. Therefore, when fabricating the spacer 20 itself, it is necessary to design and manufacture the spacer 20 with a view to it becoming equal to the prescribed cell gap d under the conditions of the connecting process, in other words, environmental conditions, such as atmospheric pressure, humidity, and temperature, as well as the ultraviolet irradiation conditions, and the like, employed in the connecting process. Stated alternatively, the thickness of the spacer must be such that the cell gap achieves a specified design value when the sealant material has hardened and the spacers have been withdrawn.

Desirably, since the spacer thickness is dependent on the value of the cell gap, a suitable value should be determined in accordance with the design, but in the case of the cell gap of a current display device, the spacer thickness should be set, desirably, to 30 µm or thereabouts, for example.

In this specification, the shape of the spacer 20 may be varied appropriately, within a range that is not detrimental to the object of the present invention. For example, the figures respectively depict representative states where the surfaces of the first substrate 10 and the second substrate 12 are supported on the spacers 20, but it is also possible to adopt a mode where, for example, a plurality of gears are provided in a comb shape, and the upper and lower substrates are supported in a line or at points. Moreover, it is also possible, for example, to adopt a mode where the plurality of gears are operated independently with respect to each other.

The material of the spacer 20 may be selected as appropriate provided that it is not detrimental to the objects of the present invention, but desirably, pure nickel, for example, should be used as the material for the spacer.

For the method of manufacturing the spacer 20, desirably, electroforming should be used.

The spacer operating mechanism 22 is depicted in block form in FIGS. 1(A) and 1(B), but this mechanism 22 may be a mechanism of any desired composition corresponding to the design, provided that it causes the spacer 20 to move in a direction for inserting or withdrawing same. For example, the spacer operating mechanism 22 may be selected appropriately within a range that is not detrimental to the objects of the present invention, and desirable examples thereof include a micro motor, micro manipulator, or the like.

FIGS. 1(A) and 1(B) show states where the first substrate 10 and the second substrate 12 are held by inserting spacers 20 from the four sides thereof, in a perpendicular direction to the end faces of the substrates. However, the substrates may also be held by inserting spacers at only two opposing sides, for example, provided that it is not detrimental to the quality of the display panel. Alternatively, the substrates may be held by inserting spacers at plural corner regions of the substrates, for example, at four points or two opposing points in the waste region thereof.

As means for determining the cell gap, means for pressing the substrates is used. In the foregoing composition, a method using mechanical means such as a servo motor or pressurizing cylinder to press the substrates and make them come into contact with the spacers was described, but it is also possible to use any other suitable means instead of the servo motor or pressurizing cylinder, such as vacuum pressure using compressed air, for example.

By means of this composition, it is possible to control the cell gap accurately by means of a simple process. Moreover, if the liquid crystal medium is introduced prior to connection, then the process of sealing the introduction hole which was required in the prior art becomes obsolete. Therefore, the sealing characteristics of the cell can be enhanced, and hence leakage of liquid crystal medium, and the like, can be prevented in advance, and consequently, an increased yield rate can be expected.

(Second Embodiment)

Figure 2A:
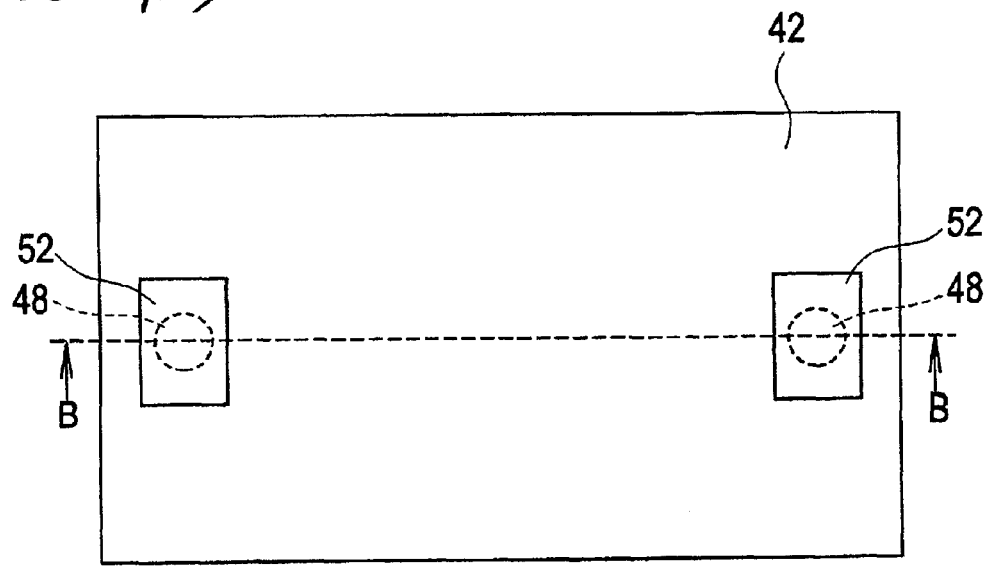
FIGS. 2(A) and 2(B) are illustrative diagrams of a second embodiment of the present invention, where 2(A) is an approximate plan view of the principal parts of a connecting device for display substrates according to the present invention; and 2(B) is a sectional view taken along line B—B in 2(A)
Figure 2B:
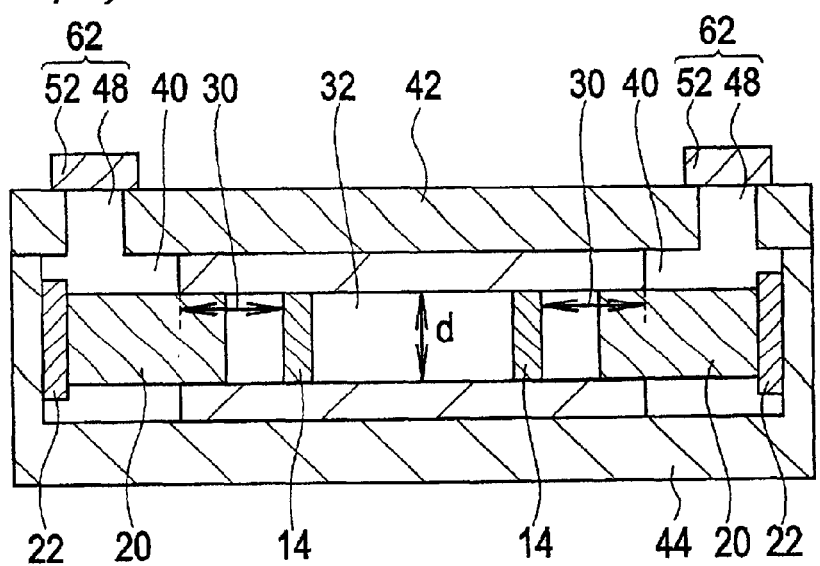

FIG. 2 shows a second embodiment of the present invention. FIG. 2(A) is an approximate plan view showing the state of a substrate connecting device viewed from above. FIG. 2(B) is a diagram showing a cross-section thereof along line B—B in FIG. 2(A).

A second embodiment of the present invention is described here with reference to FIGS. 2(A) and 2(B). In the example described here, the display panel substrates are connected or combined or laminated inside an air-tight processing chamber 40. More specifically, the processing chamber 40 is principally constituted by a first (upper) surface table 42 and a second (lower) surface table 44. The second surface table 44 is formed completely in the shape of a container, and the first surface table 42 serves as a lid of this container, forming a hermetic seal between the two tables. A vacuum exhaust system is coupled to the first surface table, to form a composition whereby the interior of the processing chamber can be evacuated to achieve a vacuum. Moreover, the interior of the processing chamber is constituted in such a manner that a variety of substrate operations and spacer operations as described previously can be performed therein.

Inside this processing chamber, the spacers 20 are previously installed in the spacer operating mechanism 22.

Similarly to the description of the first embodiment, in the processing chamber 40 containing the first (upper) surface table 42, the first substrate 10 and second 12 are mutually registered in position, and both substrates are then held. A sealant material 14 is previously disposed on either the first substrate 10 or second substrate 12, in such a manner that it forms a waste region 30 in the areas to the inner side of the substrate edges.

Thereupon, in this embodiment, the interior of the processing chamber 40 is evacuated and reduced from normal pressure to a vacuum. This evacuation process is performed by a processing chamber vacuum pump 52, which is connected to a processing chamber evacuation outlet 48 provided on the first surface table, via piping comprising a pressure regulating valve (not illustrated). Next, similarly to the case of the first embodiment, spacers 20 having a thickness substantially equal to a prescribed cell gap d are inserted into the waste region 30 between the first substrate 10 and second substrate 12, whereupon the servo motor or pressurizing cylinder (not illustrated) is actuated, and the first surface table 42 or second surface table 44 is pressed, thereby setting the cell gap d. Subsequently, similarly to the case of the first embodiment, the spacers 20 are withdrawn once the sealant material 14 has hardened.

In the current specification, the "process chamber" 40 also includes the space expected to form the cell interior 32 before the substrates are sealed, and before the sealant material 14 has hardened (hereinafter, this space is called the "expected cell interior space".) This embodiment related to a case where a processing chamber 40 is constituted by a first surface table 42 and second surface table 44, but the contacting portions between the first surface table 42 and second surface table 44 may also be formed from a suitable adhesive, such as resin, or by a further member, such as an O ring, for example.

Moreover, in this embodiment, the processing chamber 40, in other words, the expected cell interior space, and the space of the processing chamber beyond this is reduced to a vacuum, but since the object is to reduce the expected cell interior space to a vacuum, it is also possible to devise means of some kind whereby only the expected cell interior space is reduced to a vacuum.

In this specification, "normal pressure" means the atmosphere pressure surrounding the device of the present invention, and "vacuum" means that the pressure has been reduced below the atmospheric pressure by evacuating air. The degree of this vacuum is proportional to the suction power used when evacuating the air. This degree of vacuum should be set appropriately according to the objects.

According to this composition, In the manufacturing process for an organic EL panel, wherein the materials used in the manufacturing process are sensitive to moisture and oxygen, it is possible to eliminate these factors which have a significant effect on the quality of the panel, whilst also being able to control the cell gap accurately by means of a simple process. Moreover, since it is not necessary to place the sealant material in such a manner that an opening for an air is provided, as in the prior art, then it is possible to reduce labor and costs relating to the quality control of the manufactured panel. Since the sealing characteristics of the panel itself are enhanced, this contributes to increased display quality and product lifespan.

Figure 3A:
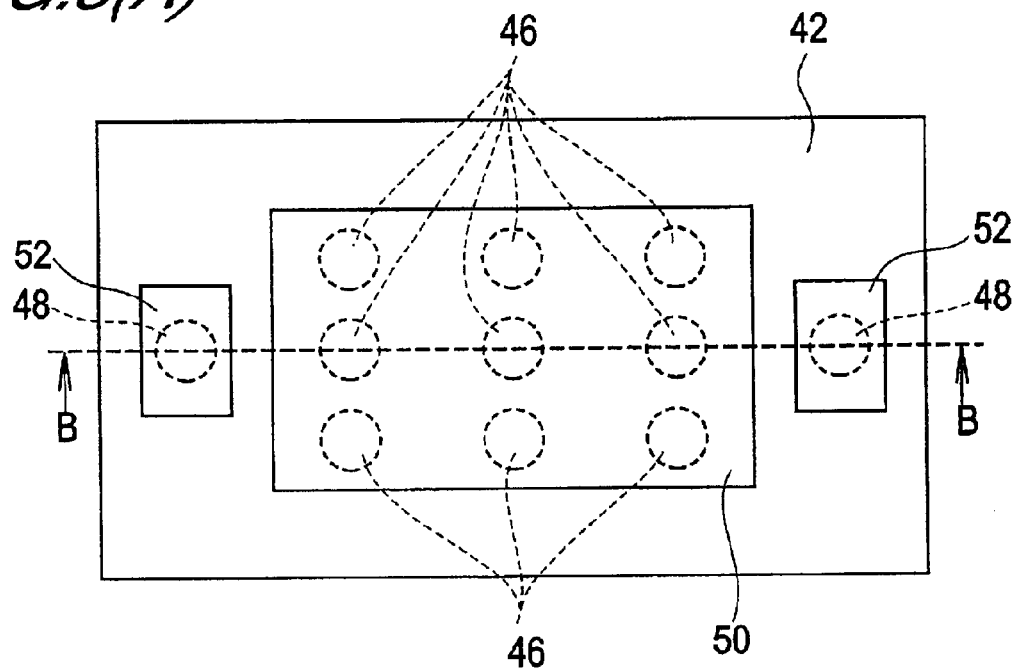
FIGS. 3(A) and 3(B) are illustrative diagrams of a modification of the second embodiment of the present invention, where 3(A) is an approximate plan view of the principal parts of a connecting device for display substrates according to the present invention; and 3(B) is a sectional view taken along line B—B in 3(A)
Figure 3B:
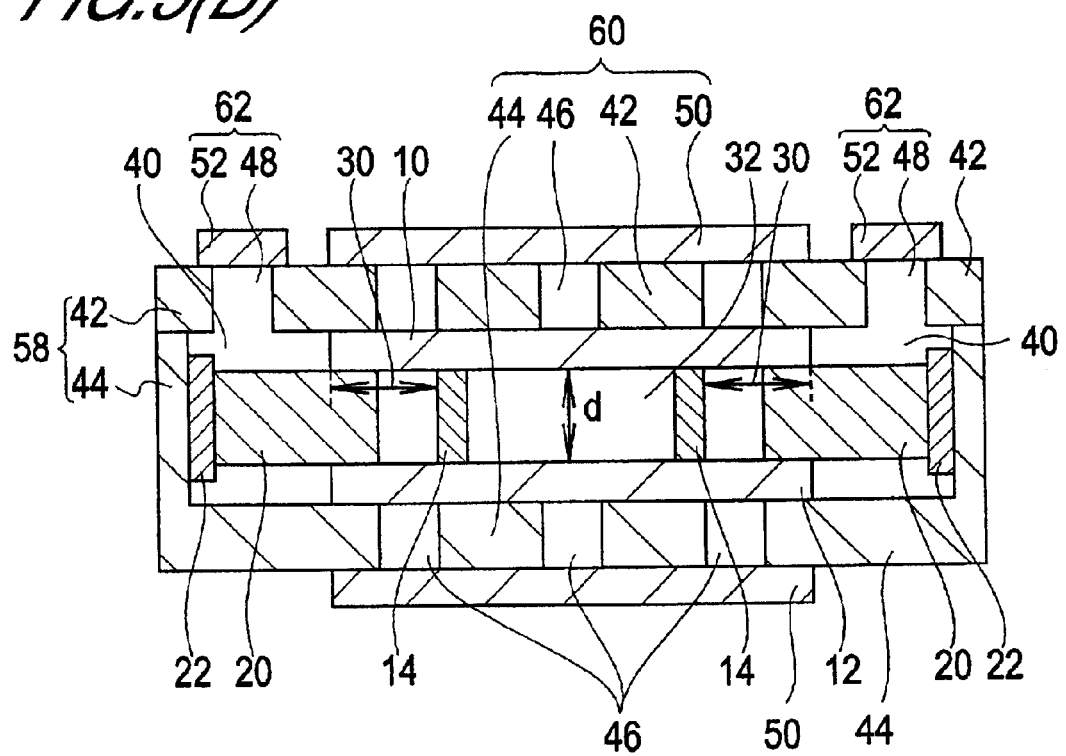

FIG. 3 is a diagram showing a modification of the second embodiment of the invention. FIG. 3(A) is an approximate plan view showing a substrate connecting device viewed from above. FIG. 3(B) shows a cross-section thereof along line B—B.

This embodiment is described here with reference to FIGS. 3(A) and 3(B). Similarly to the case of the second embodiment, inside the processing chamber 40, spacers 20 have previously been installed on the spacer operating mechanism 22. A first substrate 10 is aligned in position with a second substrate 12 whereon sealant material 14 is disposed so as to form a waste region 30 in the area to the inside of the edges of the first substrate 10 and second substrate 12, and the substrates are held. Thereupon, a processing chamber 40 comprising a first surface table 42 and second surface table 44 is reduced from normal pressure to a vacuum by sucking out the air using a processing chamber vacuum pump 52 connected to a processing chamber exhaust outlet 48 via piping comprising a pressure regulating valve (not illustrated). Thereupon, spacers 20 having a thickness substantially equal to a prescribed cell gap d are inserted into the waste region 30 between the first substrate 10 and the second substrate 12.

In this modification, in particular, the processing chamber 40 reduced to a vacuum, in other words, the expected cell interior space and the space other than this expected space is returned to normal pressure whilst ensuring that the pressure differential between these spaces is substantially zero.

Similarly to the case of the second embodiment, the first substrate 10 and second substrate 12 are pressurized by means of a servo motor or pressurizing cylinder (not illustrated), thereby determining the cell gap d, and when the sealant 14 has hardened, the spacers 20 are then withdrawn.

In this modification, a process wherein the expected cell interior space and the remaining space of the processing chamber are maintained so as to have a substantially equal pressure whilst being returned to normal pressure is added for the following reason. If air is introduced suddenly into the processing chamber 40, a large pressure difference will arise between the expected cell interior space and the remaining space of the processing chamber. If the interval between the substrates is sealed whilst this pressure differential remains, the substrate will deform and hence the cell gap d will, for instance, be different between the center region and the perimeter region of the cell. Consequently, reverting to normal pressure without creating a pressure difference serves to prevent the occurrence of deformation of the substrates.

Desirably, the processing for returning from a vacuum to normal pressure is performed in a state where the first substrate 10 and the second substrate 12 are in close proximity.

Desirably, the air supplied in this process is cleaned by means of a filter, or the like, for example.

As stated in the description of FIG. 2, means of some kind for creating a vacuum in the expected cell interior space only may also be provided.

By means of this composition, it is possible to control the cell gap accurately by means of simple processes, even in a manufacturing process for a display panel using flexible substrates, for example.

Moreover, in the compositional example shown In FIGS. 3(A) and 3(B), during the processing from the positional alignment of the first substrate 10 and the second substrate 12 until the sealant material has completely hardened, the first substrate 10 and the second substrate 12 are respectively sealed and held by the first surface table 42 and the second surface table 44. The sealing between the substrates and the surface tables is achieved between the respective outer faces of the substrates on the other sides thereof to the mutually opposing inner faces of the respective substrates, and respective contact faces of the surface tables 42 and 44 respectively opposing the aforementioned outer faces. In order to achieve a hermetic seal, the substrates are vacuum suctioned by evacuating air by a vacuum exhaust system including a substrate holding vacuum pump 50, from substrate holding evacuation holes 46 provided in the surface tables 42 and 44, via piping provided with a pressure regulating valve (not illustrated). These substrate holding evacuation holes 46 are vacuum exhaust holes for suction holding the first and second substrates 10 and 12, respectively.

Here, the degree of vacuum for holding the substrates should be sufficient to hold the substrates, regardless of whether or not a vacuum evacuation of the processing chamber 40 is required. If the processing chamber 40 is to be reduced to a vacuum, then the suction power for evacuating the air therein must be adjusted in such a manner that the uppermost positioned substrate in the gravity direction, in the present example, the first substrate 10, does not fall down.

This composition can be applied to all of the embodiments of the present invention and not only to the second modification example.

Moreover, the size and number of evacuation holes can be modified as desired according to the desired panel specifications.

According to this composition, it is possible to prevent effectively deformation of the actual substrates whilst simultaneously holding the substrates.

As shown in FIGS. 3(A) and 3(B), if the processing chamber 40 is reduced to a vacuum, desirably, the air suction power for evacuating the processing chamber 40 should be set to a smaller value than the air suction power for sealing the first substrate 10 and second substrate 12.

By means of this composition, it is possible to hold the first substrate 10 and second substrate 12 in a stable fashion, and moreover, whilst preventing the first substrate 10 held by the first surface table 42 from falling downwards, or the second substrate held by the second surface table 44 from diverging from its position, and hence the cell gap can be controlled accurately.

(Third Embodiment)

Figure 4:
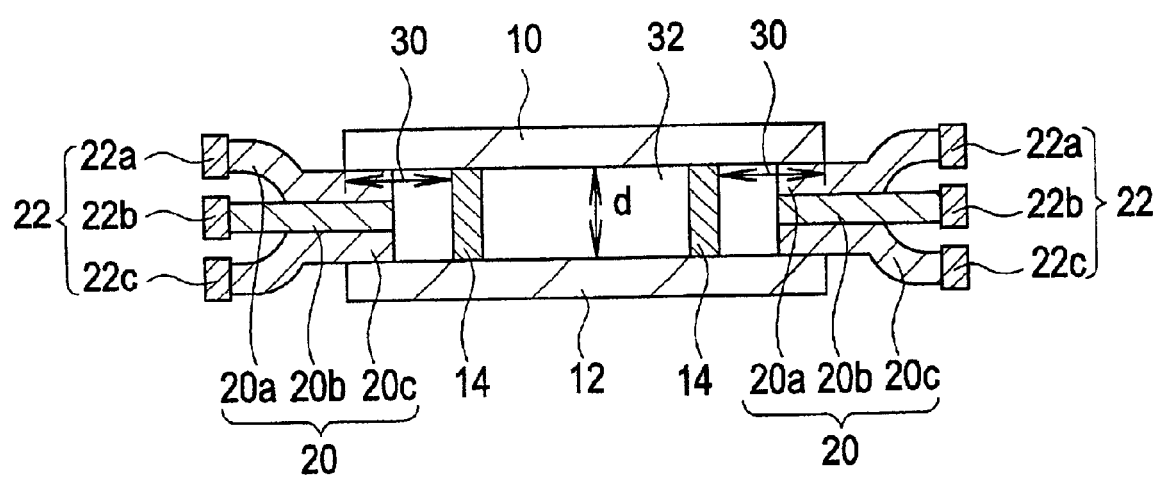
FIG. 4 is an illustrative diagram of a third embodiment of the present invention, showing an approximate sectional view for the purpose of describing a spacer.

FIG. 4 is a diagram for describing a third embodiment of this invention, and it depicts an approximate cross-sectional view of the substrates in the connecting device. The plan diagram viewing the substrates from above is the same as FIG. 1(A) and is omitted here.

The third embodiment of the present invention is described now with reference to FIG. 4. In this example, the spacers 20 are laminated or stacked type spacers comprising a plurality of spacer elements numbering three or more, in other words, a first spacer element 20a, a second spacer element 20b, a third spacer element 20c, and the like. These laminated spacers are desirably of the same thickness, but they may also be of different thicknesses. The spacer elements are layered on top of each other in a mutually separable fashion. Before the process of inserting the spacers, the end portions of the first spacer element 20a, second spacer element 20b and third spacer element 20c are installed individually in the respective spacer operating mechanisms 22a, 22b, 22c.

These spacers elements 20a, 20b, 20c are inserted in a layered state between the substrates. As stated previously, after the sealant has hardened, the cell gap d is maintained as a uniform value. Therefore, after hardening of the sealant, the spacer element positioned in the middle of the spacer obtained by layering of the spacer elements can be withdrawn without affecting the cell gap d.

Therefore, in this example, the spacer elements contacting and holding the first substrate 10 and second substrate 12, in other words, the first spacer element 20a and third spacer element 20c, are left behind, in other words, the upper and lower substrates are supported by spacer elements, whilst the spacer elements positioned substantially in the middle region, in other words, the second spacer element 20b, is withdrawn by actuating the second spacer element operating mechanism 22b. Subsequently, the remaining spacer elements, in other words, the first spacer element 20a and the third spacer element 20c are respectively withdrawn by actuating the first spacer element operating mechanism 22a and the third spacer element operating mechanism 22c. By this means, the cell gap can be controlled by the total thickness of the plurality of spacer elements before they are withdrawn.

Here, the spacer elements supporting the substrates during the process of withdrawing a portion of the spacer elements are not limited to one spacer element, but rather, the substrates may also be supported by two, three or more spacer elements. Moreover, the same applies to the number of spacer elements positioned in substantially the middle region. Therefore, "positioned substantially in the middle region" does not necessarily mean only the spacer element containing the center line of the whole set of spacers, but may also include any other spacer elements that are not contacting and supporting the upper or lower substrates.

When withdrawing the spacer elements positioned substantially in the middle region, in other words, the second spacer element 20b, great care is required in order that the spacer element is withdrawn from the substrates in a horizontal direction.

When withdrawing the other spacer elements, in other words, the first spacer element 20a and third spacer element 20c, since the sealant has already hardened, the spacer elements may be withdrawn horizontally from the substrates in such a manner that the substrates are not damaged, or the first spacer element 20a supporting the uppermost positioned first substrate 10 may be withdrawn at an offset in the downward direction or an oblique downward withdrawal direction into the space of the waste region 30, and the third spacer element 20c supporting the undermost positioned second substrate 12 may be withdrawn, similarly, at an offset in the upward direction of an oblique upward withdrawal direction into the spacer of the waste region 30.

In order to protect the substrates, and to improve sliding between the spacer elements, the spacer or plurality of spacer elements according to the present invention should be provided with a coating of silicon thin film, for example, provided that this is not detrimental to the objects of the present invention.

The points to note in the manufacture of the spacer elements themselves are similar to those in the foregoing embodiments. Namely, they should be designed and manufactured so as to have a prescribed thickness under the actual conditions of use.

In the case of a laminated spacer formed by layering together spacer elements of this kind, the total thickness of the layered elements is determined by previously measuring the thickness of each respective spacer element. The spacer elements are composed in such a manner that this total thickness coincides with the designed cell gap. By this means, it is possible to adjust the spacer thickness more accurately to the designed cell gap.

Moreover, if a laminated or stacked type spacer is used, then since the spacer is withdrawn without damaging the surfaces of the substrates, a panel of excellent quality can be obtained whilst being able to control the cell gap accurately by means of a simple process.

As shown in FIG. 4, in this embodiment of the present invention, desirably, the spacer is constituted by three spacer elements, and the total thickness of the three spacer elements before withdrawal is used to control the cell gap.

Figure 5A:
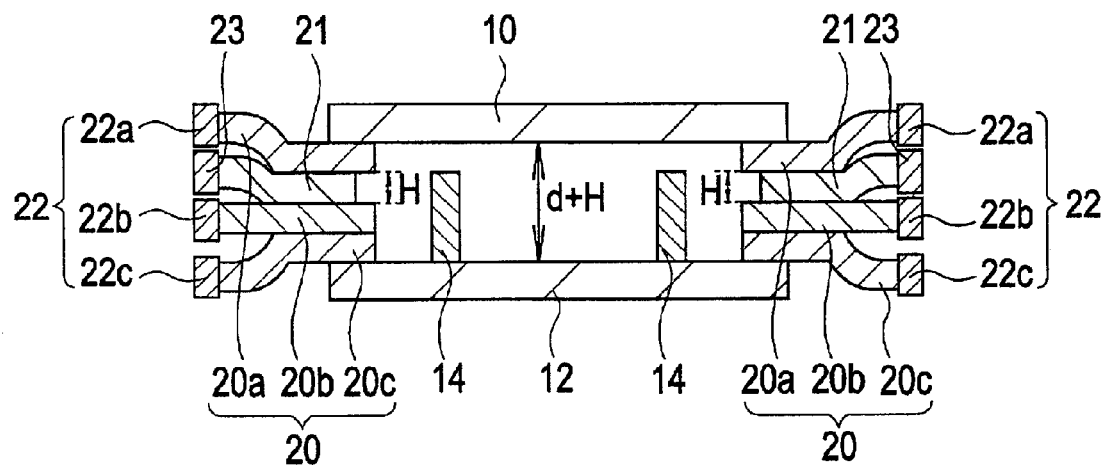
FIGS. 5(A) and 5(B) are illustrative diagrams of a modification of the third embodiment of the present invention, being approximate sectional views for the purpose of describing a further compositional example of a spacer.
Figure 5B:
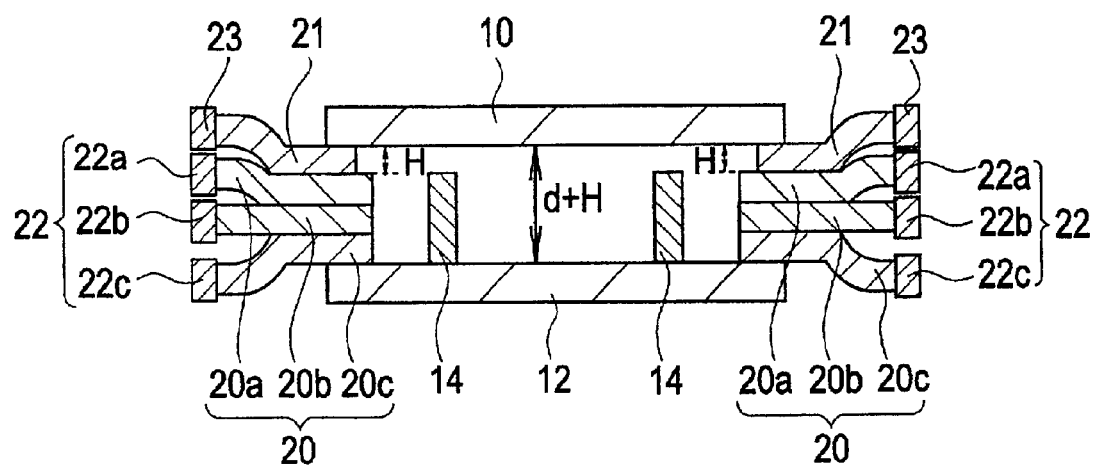

FIGS. 5(A) and 5(B) are approximate diagrams showing an example of a modification of the third embodiment of this Invention. The plan diagram viewing the substrates from above Is substantially the same as FIG. 1(A) and is omitted.

Describing this embodiment with reference to FIGS. 5(A) and (B), a spacer with auxiliary spacer is used, wherein an auxiliary spacer element 21 is appended to a spacer having a thickness substantially equal to the prescribed cell gap d. If the thickness of the auxiliary spacer element 21 is taken as H, for example, then when the spacer with auxiliary spacer is inserted in between the substrates, a substrate interval which is greater than the prescribed cell gap d, namely, an interval of d+H, is maintained. Thereupon, the auxiliary spacer element 21 is withdrawn before the sealant 14 hardens, and the substrates are pressed to make fine adjustments so that the prescribed cell gap d is achieved. Subsequently, the sealant 14 hardens and the cell gap is controlled.

In this case, the spacer with auxiliary spacer may be a single bulk-shaped spacer which itself has a thickness substantially equal to the cell gap d. Alternatively, it may be a laminated type spacer formed by layering two or more spacer elements, in other words, a first spacer element 20a, second spacer element 20b, third spacer element 20c, or the like, of which the total thickness is substantially equal to the prescribed cell gap d.

Desirably, the auxiliary spacer element is disposed in such a manner that it does not usually contact the upper or lower substrates, as illustrated in FIG. 5(A).

However, this mode of the present invention is not limited to this. In particular, in a manufacturing process for a liquid crystal display element, it is necessary to maintain a high degree of vacuum in the expected cell interior space, if this mode is applied to a connecting method comprising a pre-connection injection stage for the liquid crystal medium.

Here, a high degree of vacuum means a sufficient degree of vacuum to introduce the liquid crystal medium before lamination.

In this case, when the first substrate 10 is held by creating a vacuum between the first substrate 10 and the contact surface of the first surface table 42, if the air suction power for maintaining this vacuum is equal to or smaller than the air suction power for creating a vacuum in the processing chamber 40, in other words, in the expected cell interior space, then there is a risk that it may induce the first substrate 10 to fall off. In such cases, therefore, the auxiliary spacer element 21 is placed at a position where it can contact and support the first substrate 10, as illustrated in FIG. 5(B), thereby achieving a composition where it is used in combination with the holding means creating a vacuum between the substrate and surface table.

A compositional example is shown in FIG. 5(B). According to this compositional example, firstly, the total thickness of the spacer with auxiliary spacer is set to a value greater than the cell gap. The spacer with auxiliary spacer is then set at a prescribed position inside the processing chamber. Thereupon, whilst drawing a vacuum between the outer faces of the first and second substrates on the other sides to the mutually opposing inner faces of the substrates, and the respective contact surfaces of the first and second surface tables respectively opposing these outer faces of the substrates, the first and second substrates are respectively sealed and held to the first and second surface tables. Thereupon, the processing chamber is evacuated from normal pressure to a vacuum. The auxiliary spacer element is then inserted between the substrates, and this auxiliary spacer element contacts the first substrate and supports the substrate.

Here, the additional auxiliary spacer element is not limited to one, but rather a plurality of auxiliary spacer elements may be used.

Consequently, if a plurality of auxiliary spacer elements are placed so as to support the upper substrate, desirably, the spacer elements are withdrawn starting with the auxiliary spacer elements that are not contacting the upper substrate, until finally the auxiliary spacer element contacting the upper substrate is withdrawn.

FIG. 5(B) shows a case where the auxiliary spacer element 21 is smaller than the other spacer elements, for ease of understanding, but the invention is not limited to this, and the auxiliary spacer elements may be the same size or larger than the other spacer elements, provided that this is not detrimental to the objects of the invention.

Moreover, in cases where it is necessary to create a vacuum in the expected cell interior space, the auxiliary spacer element 21 should be shaped to have a comb-like toothed shape, in order that the gaps therein can serve as evacuation holes.

In this way, by adopting a composition using auxiliary spacers, the upper and lower substrates can be maintained in a mutually proximate state, and hence the connection or lamination position can be determined more accurately.

Moreover, if, in particular, the substrates and the contact surfaces of the surface tables are held by creating a vacuum, and the expected cell interior space is reduced to a vacuum, and in particular, a high degree of vacuum, during connection process of the substrates, then since the substrates are held accurately by the spacers and the surface tables in a state of narrow separation between the substrates when creating a vacuum, it is possible to improve the connection accuracy for flexible substrates, in particular.

Moreover, if a pre-connection injection stage is used in the fabrication of a liquid crystal display element which is required to have a high degree of vacuum in the expected cell interior space, then the auxiliary spacer member positioned so as to contact the upper substrate in the gravity direction thereof will aid the holding of the substrate by the surface table, thereby making it possible to prevent falling of the substrate. Conjointly with this, since deformation of the substrates themselves can be suppressed, as well as being able to hold the substrates by creating a vacuum between the substrates and the surface tables, then it is possible to achieve more stable cell gap control.

Desirably, in this embodiment, the sealant material is an ultraviolet-setting sealant material, and the process for hardening the sealant involves irradiating ultraviolet light.

Moreover, desirably, in this embodiment, the sealant material is a thermosetting sealant material and the process for hardening the sealant is performed by heating.

As described above, if the sealant material is an ultraviolet-setting material, then the first surface table and/or second surface table should be a quartz table, and ultraviolet light irradiating apparatus should provided.

(2) Description of Connecting Device

A compositional example of a device for implementing the foregoing method is described below.

The connecting device according to the present invention is a display panel substrate connecting device comprising a first surface table 42 and second surface table 44 for respectively holding a first substrate 10 and a second substrate 12. This device comprises, as principal components, a spacer 20 having thickness substantially equal to a prescribed cell gap d, operating means for operating the spacer 20 in order to insert the spacer 20 in between the substrates or to withdraw it from same, in other words, a spacer operating mechanism 22, and moreover, setting means for causing the sealant material 14 to set (not illustrated).

Figure 11:
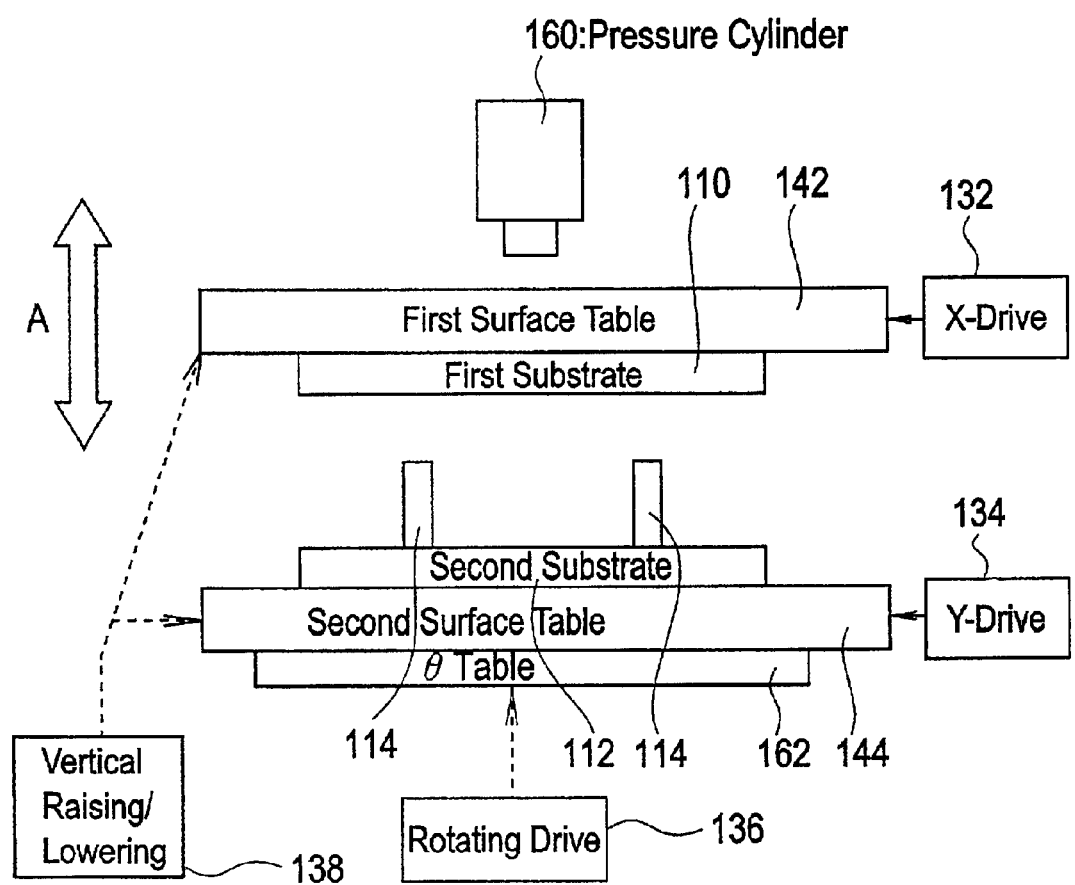
FIG. 11 is a schematic diagram of principal parts for describing a conventional substrate connecting process and a connecting device.

Here, similarly to the case of the prior art described with reference to FIG. 11, the device according to the present invention comprises respective driving mechanisms for adjusting the X axis, Y axis, and θ axis of the firs surface table and second surface table, as well as raising and lowering means for raising and lowering the first surface table 42 and/or the second surface table 44. Moreover, in order to determine the cell gap d, means for applying pressure to the substrates and surface tables, such as a pressurizing cylinder or servo motor, for example, are provided. Since these means are common means, their specific compositions and actions are not described here.

Moreover, in the connecting device of the present invention, in order to prevent electrical breakdown of the substrates, desirably, all of the portions which contact the substrates should be formed by an insulating material.

Furthermore, desirably, electrostatic removal means, such as an ion shower, or the like, should be provided in the connecting device according to the present invention. Alternatively, electrical breakdown of the substrates can be prevented effectively by coating a suitable solvent, such as alcohol, for example, onto the inner walls of the processing chamber or room.

According to the connecting device of the present invention, desirably, substrate holding means 60 for holding the substrates in hermetic contact with respective surface tables should be provided, as illustrated in FIG. 3(B). The substrate holding means 60 makes it possible to hold the first substrate 10 and the second substrate 12 in a state of hermetic contact with the surface tables, whilst drawing a vacuum between the respective outer faces of the first substrate 10 and second substrate 12 and the contact surfaces of a first surface table, in other words, an upper surface table 42, and a second surface table, in other words, a lower surface table 44, which respectively confront the outer faces of the substrates. The substrate holding means 60 comprises the two surface tables 42 and 44, and a vacuum exhaust system, wherein through holes 46 provided in the respective surface tables 42 and 44 are taken as evacuation holes, which are connected via piping provided with a pressure regulating value (not illustrated), for example, to a vacuum pump 52, or the like.

Moreover, according to the laminating device corresponding to FIG. 3 of the present invention, desirably, processing chamber defining means 58 for defining a processing chamber 40 for connecting or combining or laminating, and pressure adjusting means 62 for freely altering the pressure of the processing chamber 40 from normal pressure to vacuum pressure or from vacuum pressure to normal pressure, are provided. In the present example, the processing chamber defining means 58 is principally constituted by the first and second surface tables 42 and 44. In this way, the entire structure of the device can be made more compact by forming the processing chamber 40 by means of the surface tables 42 and 44.

In this example, the pressure adjusting means 62 is the vacuum exhaust system, wherein a through hole 48 provided in one of the surface tables, for example, surface table 42 is taken as an evacuation hole, which is connected via piping comprising a pressure regulating valve (not illustrated), for example, to a vacuum pump 52, or the like. The vacuum exhaust system forming the pressure adjusting means may also be used conjointly as a portion of the substrate holding means 60.

Furthermore, desirably, means such as a filter, or the like, for eliminating dust, moisture, organic solvents, and the like, should be provided in the vicinity of the vacuum pump.

Moreover, according to the connecting device corresponding to FIG. 4 of the present invention, the spacer 20 is constituted by a laminated or stacked structure comprising a plurality of spacer elements numbering three or more, namely, a first spacer element 20a, second spacer element 20b, third spacer element 20c, or the like. The total thickness of the spacer is adjusted by independent operation of the respective spacer elements. In this case, the portions of the spacer elements on the side inserted inbetween the substrates mutually overlap, but the portions on the sides of the spacer drive mechanisms 22a 22b, 22c may be separated in such a manner that the respective spacer elements can be withdrawn independently. Furthermore, they may also be mutually in contact, rather than being mutually separated, but they should allow the spacer elements to be withdrawn one by one.

Desirably, the spacer is constituted by three spacer elements.

Moreover, according to the connecting device of the present invention, desirably, the spacer is constituted by a single spacer element. In this case, the spacer should have a form whereby the cell gap can be altered. A corresponding compositional example is described now with reference to FIGS. 6(A) and FIG. 6(B).

(Fourth Embodiment)

Figure 6A:
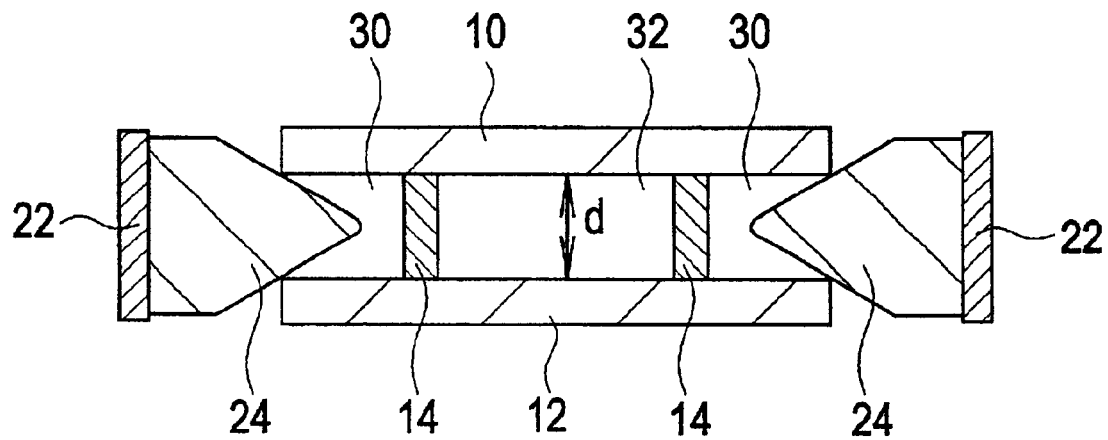
FIGS. 6(A) and 6(B) are illustrative diagrams of a modification of a fourth embodiment of the present invention, being approximate sectional views for the purpose of describing yet a further compositional example of a spacer.

FIGS. 6(A) and (B) are approximate diagrams showing a fourth embodiment of the present invention, depicting a cross-section containing substrates and spacers in a connecting device. The plan diagram viewing the substrates from above is substantially the same as FIG. 1(A) and is omitted here.

Describing this embodiment with reference to FIGS. 6(A) and (B), the device according to this fourth embodiment of the present invention comprises a wedge shaped spacers 24 having a thickness which decreases towards the tip, on the ends thereof which are inserted between the substrates 10 and 12.

FIG. 6(A) depicts an example where the spacers are plate-shaped and have a wedge-shaped cross section. According to this example, the spacers 24 are bulk-shaped block elements provided with a taper. The block element is formed integrally in a shape comprising a triangular bar-shaped block attached to a rectangular block shape. The front tip forming the point of the triangular bar is the inserted end of the block element, and the opposite end of the rectangular block to the triangular bar is the end that is attached to the spacer drive mechanism 22. In the example illustrated in FIG. 6(A), the cross-section of the triangular bar may be an equilateral triangle shape, or an isosceles triangle shape.

It is also possible to vary the shape of the spacers, for instance, to use spacer elements having a plurality of wedge shapes, provided that this is not detrimental to the object of the present invention.

Figure 6B:
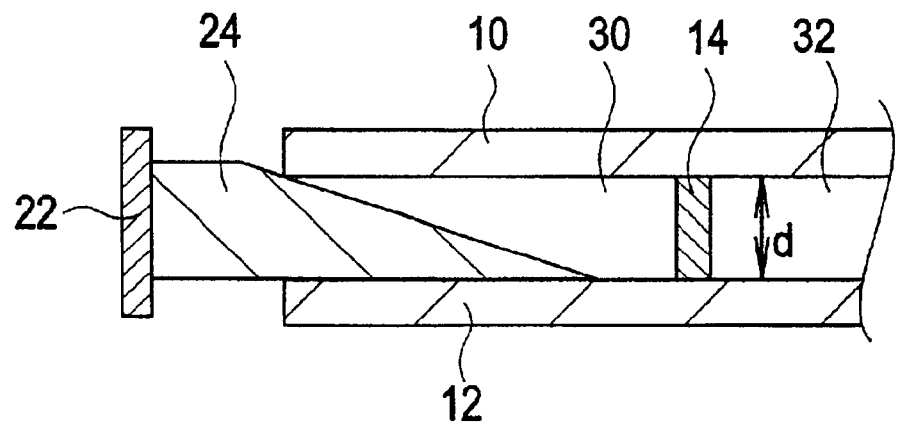

For example, in the compositional example of a spacer 24 illustrated in FIG. 6(B), the side of the spacer 24 which contacts the first substrate 10 is formed as an oblique face, in such a manner that the thickness of the spacer 24 decreases towards the tip thereof, whilst the side of the spacer which contacts the second substrate 12 is a flat surface.

By means of this tapered spacer composition, it is possible to adapt to controlling a variety of prescribed cell gaps, using one type of spacer. Since only one spacer operating mechanism 22 is used, excellent cost to performance benefits are obtained with respect to the manufacturing costs of the spacer itself and the operating costs.

(Fifth Embodiment)

Figure 7A:
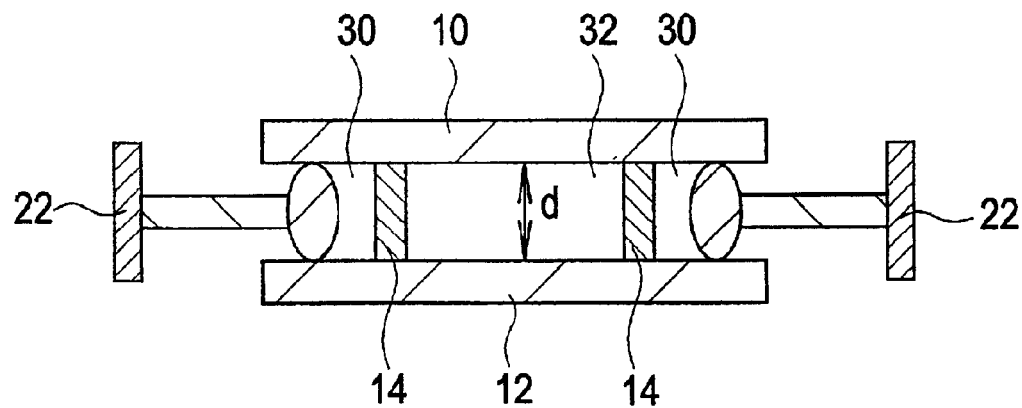
FIGS. 7(A), 7(B) and 7(C) are illustrative diagrams of a fifth embodiment of the present invention, being approximate sectional views for the purpose of describing yet a further compositional example of a spacer.
Figure 7B:
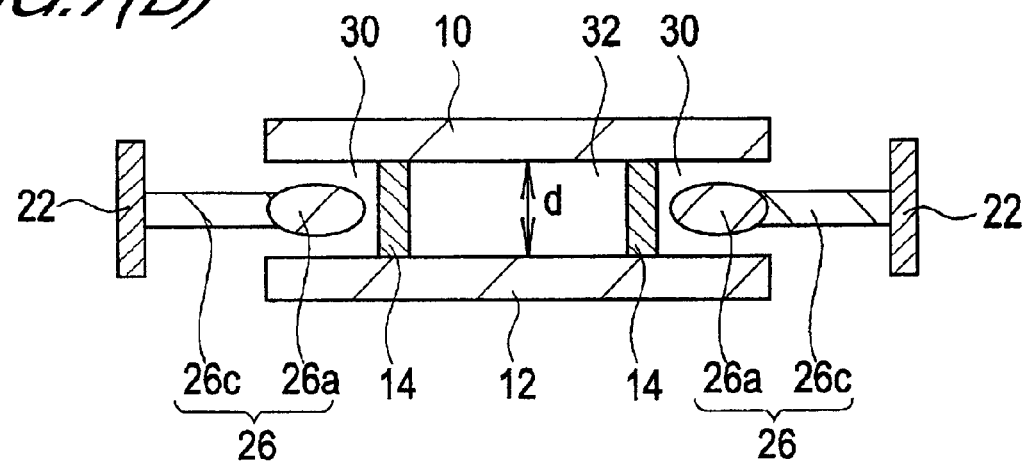
Figure 7C:
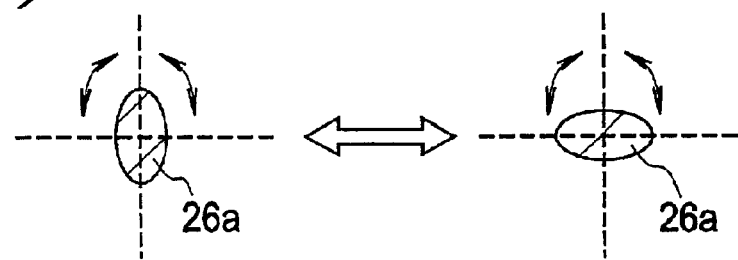

FIG. 7 and FIG. 8 are approximate diagrams for describing a fifth embodiment of the present invention. FIGS. 7(A) and 7(B) illustrate a cross-section of the substrates and spacers inside the connecting device. FIG. 7(C) is an approximate diagram of a cross-section for describing the independent operating state of a rotating head section 26a.

Figure 8A:
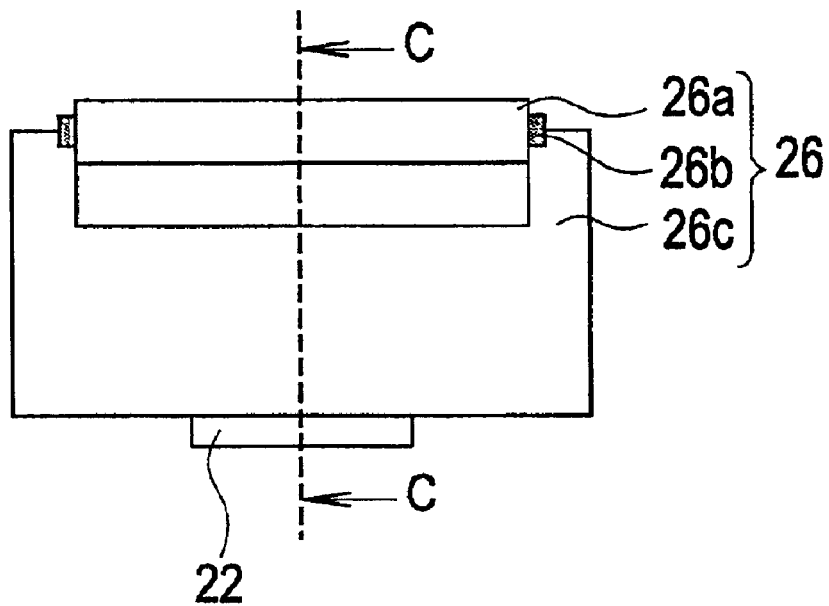
FIGS. 8(A) and 8(B) are approximate plan diagrams for describing the spacers in FIGS. 7(A), (B) and (C)
Figure 8B:
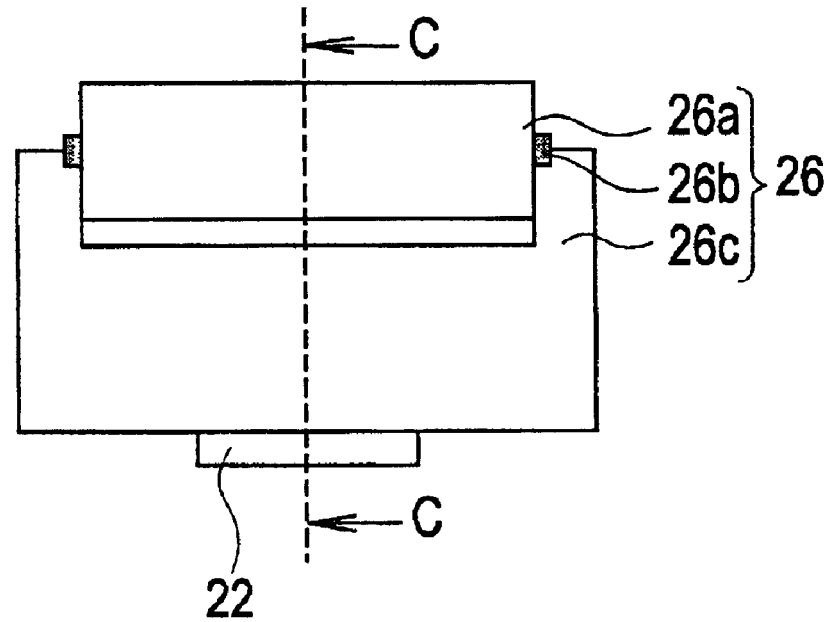

FIG. 8(A) is an approximate plan diagram viewing a variable thickness spacer 26 corresponding to FIG. 7(A) from above, and similarly, FIG. 8(B) is an approximate plan diagram viewing a variable thickness spacer 26 corresponding to FIG. 7(B) from above. Line C—C in FIG. 8(A) and FIG. 8(B) is the line used to obtain the cross-sections in FIGS. 7(A) and 7(B).

According to the device relating to this embodiment, the variable thickness spacer 26 comprises a rotating head section 26a constructed to have a smooth elliptical vertical section. This rotating heed section 26a is composed such that it rotates about a suitable point on the interior or surface thereof. In the compositional example shown in FIGS. 7(A) and 7(B), the rotating head section 26a has an elliptical bar shape or rotating elliptical bar shape. Moreover, the rotating head section 26a is composed in such a manner that it turns about the long axis or short axis, taking the origins of the long axis or short axis of the ellipse as the center of rotation.

By turning this rotating head section 26a within the waste region 30, the surfaces of the rotating head section 26a change the positions at which they contact the first substrate 10 and second substrate 12, and hence the cell gap d can be controlled thereby.

In the variable thickness spacer 26, desirably, a composition is adopted wherein the long axis or short axis of the vertical section of the rotating head section 26a can be exchanged mutually, by turning the rotating head section 26a freely in the direction of the arrow in FIG. 7(C) by means of a rotating head operating mechanism 26b, within the space of the waste region.

Here, "vertical section" means a cross section along dotted line C—C running from top to bottom, wherein the rotating head section 26a of the variable thickness spacer 26 is on the upper side of the spacer, as illustrated in FIG. 8(A) and FIG. 8(B).

Moreover, this embodiment includes not only cases where the long axis and short axis of the cross-section of the rotating head section 26a are exchanged completely, but also intermediate states where the short axis or long axis of the rotating head section are inclined in a non-perpendicular state with respect to the substrates.

Here, the rotating head section 26a is a rugby ball-shaped solid member, and this embodiment includes all states where this member is rotated so as to contact and support the substrates, provided that this is not detrimental to the objects of the invention.

By means of this composition, since the contact surface area between the substrates and the spacer is very small, the possibility of damaging the substrate surface is reduced. Moreover, if the substrate can be supported with the rotating head section 26a in an inclined state, then a plurality of prescribed cell gaps can be covered by a single type of spacer, and hence excellent cost to performance characteristics are obtained, with respect to manufacturing costs and operating costs.

Moreover, according to the connecting or combining or laminating device of the present invention, desirably, the upper surface table and/or lower surface table should be made of quartz, and ultraviolet light irradiating apparatus should be provided as hardening means.

Furthermore, according to the connecting or combining or laminating device of the present invention, the upper surface table and lower surface table should be heating plates made from metal.

As stated previously, the various embodiments described above related to examples for fabricating a single display panel from one set of connected substrates, but it can readily be understood that this invention may also be applied to a multiple-yield substrate wherein a plurality of display panels can be obtained in separate fashion from one set of connected substrates.

Figure 9:
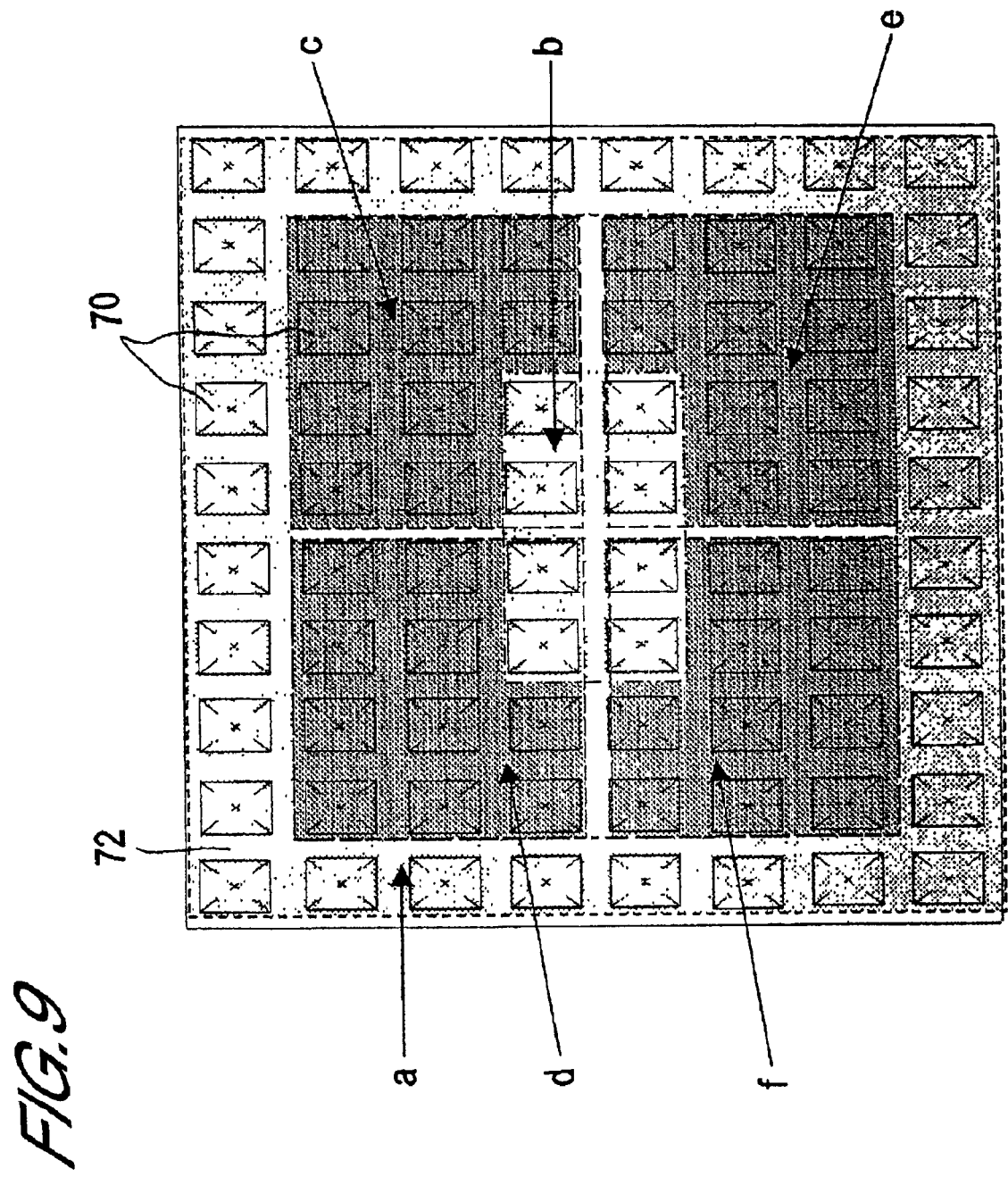
FIG. 9 shows a drawing for explaining cell gap of a display panel obtained in accordance with the present invention using a spacer.

FIG. 9 is a diagram providing an illustration of the cell gap in a case where the present invention is applied to a multiple-yield substrate.

Figure 10:
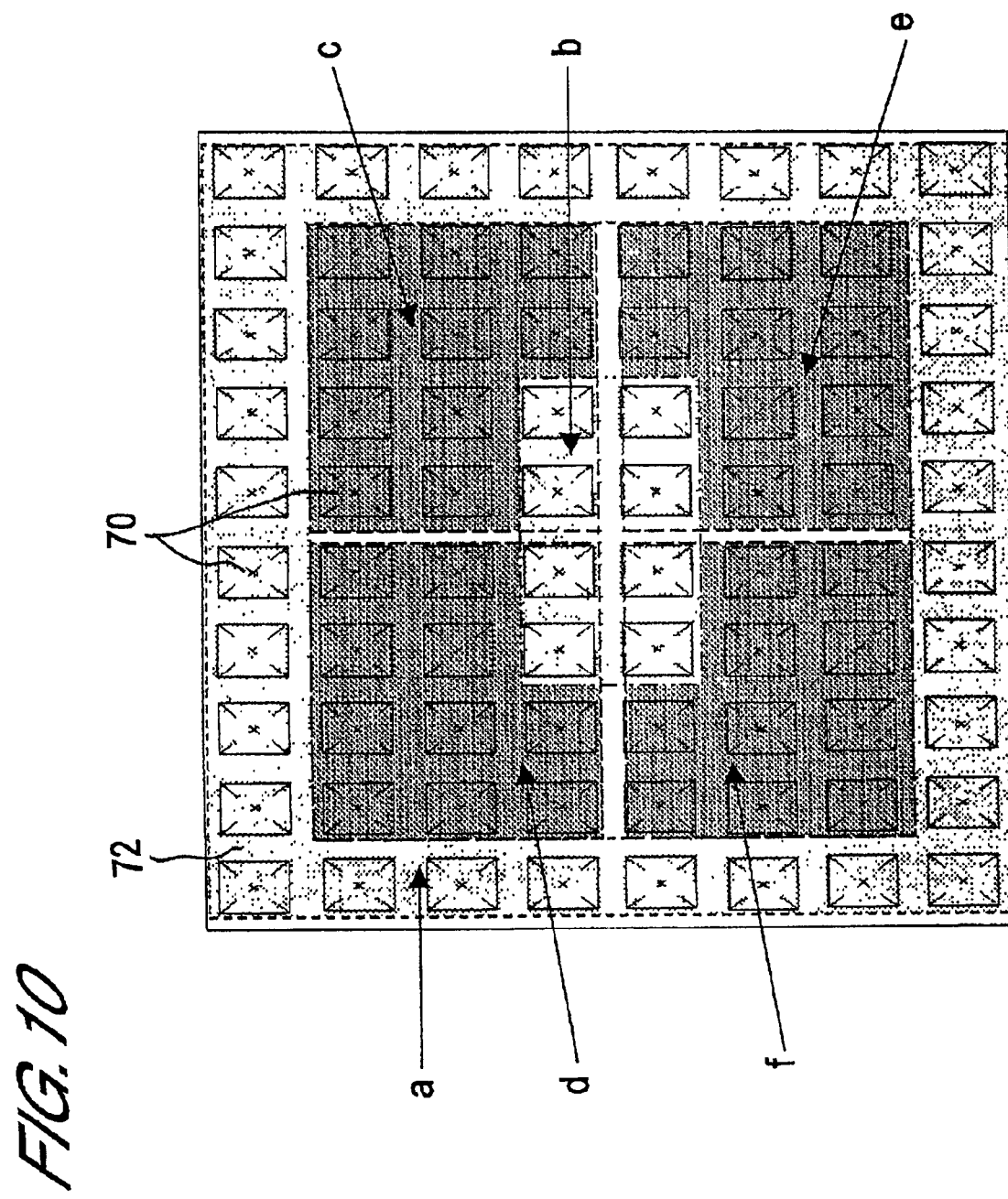
FIG. 10 shows a drawing for explaining cell gap of a display panel obtained in accordance with the prior art without using a spacer.

FIG. 10 is a diagram providing an illustration of the cell gap in a case where a prior art method is applied to the same multiple-yield substrate, for the purpose of comparison.

The multiple-yield substrate used here comprises square glass substrates of 400 mm×400 mm, for example, 80 individual cells (or display regions (windows)) are fabricated from these connected substrates, for example. Representative cells are Indicated by numeral 70. The respective cell regions are surrounded by sealant material segments arranged in a lattice shape. Representative sealant material segments are indicated by numeral 72. In this example, the cells are rectangular in shape, having longer edges of 34.54 mm and shorter edges of 25.91 mm. The cells are, for example, arranged in a matrix of 8 rows by 10 columns, in such a manner that the center-to-center interval between adjacently positioned cells is 4 mm in both the row direction and the column direction.

The cell gap was measured at a plurality of locations on this set of connected substrates, and the respective average values of the cell gap were derived for the outer circumference (perimeter) region, the central region including the central point, and four regions, namely, the left/right/top/bottom regions, of the internal region.

In FIG. 9 and FIG. 10, the outer circumference region is the region enclosed by the dotted line and the broken line, the central region including the central point is the region enclosed by the double-dotted line, and the respective four regions in the internal region are the regions respectively demarcated by the broken lines and double-dotted line. The average value for the outer circumference region is taken as a, the average value for the central region, as b, the average value for the top right region, as c, the average value for the top left region, as d, the average value of the bottom right region, as e and the average value of the bottom left region. as f.

According to the present invention, in the case of a connected substrate which is obtained by using spacers (the substrates illustrated in FIG. 9), the values obtained were a=1.33 mm, b=1.32 mm, c=1.32 mm, d=1.32 mm, e=1.31 mm and f=1.31 mm. As these results clearly reveal, the difference between the maximum cell gap and the minimum call gap is 0.02 mm, and hence the cell gap accuracy is very good.

On the other hand, in the case of a connected substrate which is obtained by means of the prior art method, without the use of spacers, (the substrates illustrated in FIG. 10), the values obtained were a=1.43 mm, b=1.31 mm, c=1.33 mm, d=1.34 mm, e=1.32 mm and f=1.32 mm. As these results demonstrate, the difference between the maximum cell gap and the minimum cell gap is 0.11 mm, and hence the cell gap accuracy is very poor.

According to the connecting or combining or laminating method for display panel substrates and the device for implementing same, of the present invention, it is possible to control the cell gap accurately by means of a simple process. Moreover, this method and device are suitable for application in connection processing including a stage for introducing liquid crystal medium prior to connection, and in connection processing for an organic EL panel, and since a process for sealing a liquid crystal introduction opening, as required in the past, is not necessary, this method contributes to reducing manufacturing costs and improving panel quality.

What is claimed is:

1. A method for connecting display panel substrates comprising:
   (1) aligning the positions of and holding a first substrate and a second substrate whereon sealant material is disposed so as to form a waste region in an inner side region of the edges of the first and second substrates;
   (2) inserting a spacer having a plurality of spacer elements numbering three or more, which are layered together in a mutually separable fashion, in the waste region between said first and second substrates;
   (3) adjusting a cell gap by the total thickness of the plurality of spacer elements, and setting the cell gap by pressing the first and second substrates;
   (4) hardening the sealant material; and
   (5) withdrawing one of the spacer elements located in substantially a middle region of the spacer whilst leaving the spacer element that contact and hold the first and second substrates, and then subsequently withdrawing the remaining spacer elements.

2. The method for connecting display panel substrates according to claim 1, wherein the hardening of said sealant material is performed by irradiation of ultraviolet light.

3. The method for connecting display panel substrates according to claim 1, wherein the hardening of said sealant material is performed by heating.

4. A method for connecting display panel substrates comprising:
   (1) aligning the positions of and holding a first substrate and a second substrate whereon sealant material is disposed so as to form a waste region in an inner side region of the edges of the first and second substrates;
   (2) inserting a spacer and an additional auxiliary spacer element in the waste region between the first and second substrates, wherein the additional auxiliary spacer element is caused to contact the first substrate and the total thickness of the spacer and the additional auxiliary spacer element is set at a value that is greater than a prescribed cell gap;
   (3) adjusting the prescribed cell gap by withdrawing the additional auxiliary spacer element;
   (4) setting the cell gap by pressing the first and second substrates;
   (5) hardening the sealant material; and
   (6) withdrawing the spacer.

5. The method for connecting display panel substrates according to claim 4, wherein the hardening of said sealant material is performed by irradiation of ultraviolet light.

6. The method for connecting display panel substrates according to claim 4, wherein the hardening of said sealant material is performed by heating.

7. A method for connecting display panel substrates comprising:
   (1) placing a first substrate and a second substrate in an air-tight processing chamber;
   (2) aligning the positions of and holding the first substrate and the second substrate whereon sealant material is disposed so as to form a waste region in an inner side region of the edges of the first and second substrates, wherein the first and second substrates are respectively fayed with and held on first and second surface tables, whilst drawing a vacuum between the outer faces of the first and second substrates on the other sides thereof to the mutually opposing inner faces of the first and second substrates, and contact surfaces of the first and second surface tables which respectively confront the outer sides of the first and second substrates;
   (3) evacuating the processing chamber from normal pressure to vacuum pressure;
   (4) inserting a spacer and an auxiliary spacer element in the waste region between the first and second substrates such that the auxiliary spacer element is caused to contact the first substrate, wherein a total thickness of the spacer and the auxiliary spacer element is set to a value that is greater than a prescribed cell gap;
   (5) adjusting the prescribed cell gap by withdrawing the additional auxiliary spacer element;
   (6) setting the cell gap by pressing the first and second substrates;
   (7) hardening the sealant material; and
   (8) withdrawing the spacer.

8. The method for connecting display panel substrates according to claim 7, wherein the hardening of said sealant material is performed by irradiation of ultraviolet light.

9. The method for connecting display panel substrates according to claim 7, wherein the hardening of said sealant material is performed by heating.

* * * * *